(12) United States Patent
Lee et al.

(10) Patent No.: US 9,626,935 B2
(45) Date of Patent: Apr. 18, 2017

(54) STEREOSCOPIC IMAGE DISPLAY DEVICE AND METHOD FOR DRIVING THE SAME

(71) Applicant: LG Display Co., Ltd., Seoul (KR)

(72) Inventors: Jeongki Lee, Paju-si (KR); Joonyoung Park, Paju-si (KR); Jaewoo Park, Goyang-si (KR); Dongjun Choi, Paju-si (KR); Eunkyung Seong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 569 days.

(21) Appl. No.: 13/693,982

(22) Filed: Dec. 4, 2012

(65) Prior Publication Data

US 2013/0293593 A1     Nov. 7, 2013

(30) Foreign Application Priority Data

May 4, 2012   (KR) .................. 10-2012-0047716

(51) Int. Cl.
| | | |
|---|---|---|
| G02B 27/26 | (2006.01) | |
| G02B 5/30 | (2006.01) | |
| G09G 5/10 | (2006.01) | |
| G09G 3/36 | (2006.01) | |
| G09G 5/00 | (2006.01) | |
| H04N 13/00 | (2006.01) | |
| H04N 13/04 | (2006.01) | |

(52) U.S. Cl.
CPC .............. *G09G 5/10* (2013.01); *G02B 27/26* (2013.01); *G09G 3/3696* (2013.01); *G09G 5/00* (2013.01); *H04N 13/0025* (2013.01); *H04N 13/0434* (2013.01); *H04N 13/0497* (2013.01); *G02B 5/3016* (2013.01); *H04N 2213/002* (2013.01)

(58) Field of Classification Search
None
See application file for complete search history.

(56) References Cited

U.S. PATENT DOCUMENTS

| | | | |
|---|---|---|---|
| 7,161,626 B1 * | 1/2007 | Nara | H04N 5/361 348/243 |
| 2006/0033936 A1 * | 2/2006 | Lee et al. | 358/1.2 |
| 2006/0177124 A1 * | 8/2006 | Ha | H04N 13/0029 382/154 |
| 2008/0198218 A1 * | 8/2008 | Liu | H04N 13/0029 348/43 |
| 2011/0007132 A1 * | 1/2011 | Redmann et al. | 348/42 |
| 2011/0128269 A1 * | 6/2011 | Lee et al. | 345/211 |
| 2011/0211042 A1 * | 9/2011 | Thorpe et al. | 348/43 |
| 2011/0279659 A1 * | 11/2011 | Jung | 348/54 |

(Continued)

FOREIGN PATENT DOCUMENTS

| | | |
|---|---|---|
| KR | 10-2012-0004814 A | 1/2012 |
| KR | 10-2012-0037661 A | 4/2012 |

*Primary Examiner* — David D Davis
(74) *Attorney, Agent, or Firm* — Fenwick & West LLP

(57) ABSTRACT

Embodiment relate to a display panel that modulates 3D image data based on pixel data of adjacent lines. The display panel includes data lines, gate lines, and a plurality of pixels; a data modulation unit. The modulation unit modulates kth pixel data of a jth line in 3D image data based on the kth pixel data of the jth line and kth pixel data of a line adjacent to the jth line. The data driving circuit converts the modulated 3D image data into analog data voltages and outputs the analog data voltages to the data lines. A gate driving circuit sequentially outputs gate pulses to the gate lines.

17 Claims, 10 Drawing Sheets

(56) References Cited

U.S. PATENT DOCUMENTS

2012/0007858 A1* 1/2012 Baek .................. G02B 27/26
 345/419
2012/0057776 A1* 3/2012 Tao et al. .................. 382/154

* cited by examiner

Prior Art

FIG. 2

| RGBL | RGBR | Luminance (nit) |
|---|---|---|
| G255 | G255 | 107.10 |
| G255 | G191 | 105.60 |
| G255 | G127 | 104.70 |
| G255 | G63 | 104.00 |
| G255 | G0 | 103.30 |

Prior Art

STEREOSCOPIC IMAGE DISPLAY DEVICE AND METHOD FOR DRIVING THE SAME

CROSS-REFERENCE TO RELATED APPLICATIONS

This application claims the benefit under 35 U.S.C. §119(a) of Korean Patent Application No. 10-2012-0047716 filed on May 4, 2012, which is incorporated by reference herein in its entirety.

BACKGROUND

Field

This document relates to a patterned retarder type stereoscopic image display device capable of reducing 3D crosstalk and a method for driving the same.

Related Art

Stereoscopic image displays are classified into displays using a stereoscopic technique and displays using an autostereoscopic technique. The stereoscopic technique uses parallax images of left and right eyes to implement enhanced 3D effect. The stereoscopic technique includes a glasses method and a non-glasses method, both of which have been put to practical use. The glasses method may be classified into a patterned retarder method and a shutter glasses method. In the patterned retarder method, polarization directions of left and right parallax images are changed to display the left and right parallax images on a display device and implement a 3D image using polarization glasses. In the shutter glasses method, left and right parallax images are displayed on a display device in a time-division manner to implement a 3D image using liquid crystal shutter glasses. In the non-glasses method, optical parts, such as a parallax barrier and a lenticular lens, are used to separate optical axes of left and right parallax images and implement a 3D image.

FIG. 1 is a view showing a patterned retarder type stereoscopic image display device. Referring to FIG. 1, the patterned retarder type stereoscopic image display device implements a stereoscopic image by using polarization characteristics of a patterned retarder PR disposed on a display panel DIS and polarization characteristics of polarization glasses PG worn by a user. The patterned retarder type stereoscopic image display displays a left-eye image on odd-numbered lines of the display panel DIS and displays a right-eye image on even-numbered lines of the display panel DIS. In the patterned retarder PR, first retarders RET1 are formed on the odd-numbered lines, and second retarders RET2 are formed on the even-numbered lines. The left-eye image of the display panel DIS is converted into first circularly polarized light by the first retarders RET1, and the right-eye image of the display panel DIS is converted into second circularly polarized light by the second retarders RET2. A left-eye polarization filter of the polarization glasses PG allows only the first circularly polarized light to pass therethrough, and a right-eye polarization filter thereof allows only the second circularly polarized light to pass therethrough. Thus, the user views only the left eye image through his or her left eye and views only the right eye image through his/her right eye.

FIG. 2 is a table illustrating luminance values of left-eye image data and right-eye image data supplied to the related art stereoscopic image display device. Referring to FIG. 2, the present applicant supplied left-eye image data RGBL having a 255 gray scale value G255 and right-eye image data having a 255 gray scale value G255, a 191 gray scale value G191, a 127 gray scale value G127, a 63 gray scale value G63, and a 0 gray scale value G0, and then measured the luminance of a left-eye image input into the left-eye filter of the polarization glasses PG.

Because the left-eye filter of the polarization glasses PG allows only the left-eye image to pass therethrough, the luminance of the left-eye image having passed through the left-eye filter of the polarization glasses PG has to be uniform irrespective of the right-eye image. However, as shown in FIG. 2, the luminance of the left-eye image having passed through the left-eye polarization filter of the polarization glasses PG increases as the gray scale value of the right-eye image data RGBR increases. In other words, the luminance of the left-eye image having passed through the left eye polarization filter of the polarization glasses PG is affected by the luminance of the right-eye image. Hence, the related art patterned retarder type stereoscopic image display device may experience a three-dimensional (3D) crosstalk, in which the user sees doubled images by leaking part of the left-eye image into the right-eye image and vice versa. The 3D crosstalk may cause user inconvenience when the user views the stereoscopic image.

SUMMARY

The present invention has been made in an effort to provide a patterned retarder type stereoscopic image display device capable of reducing 3D crosstalk and a method for driving the same.

A stereoscopic image display device according to an exemplary embodiment of the present invention comprises: a display panel comprising data lines, gate lines, and a plurality of pixels; a data modulation unit that outputs modulated 3D image data by modulating kth pixel data of a jth line based on the kth pixel data of the jth line and kth pixel data of a line adjacent to the jth line, wherein k is a natural number less than or equal to n and greater than 1, and n is a horizontal resolution of the display panel, wherein j is a natural number less than or equal to m and greater than 2, and m is a vertical resolution of the display panel; a data driving circuit that converts the modulated 3D image data into analog data voltages and outputs the analog data voltages to the data lines; and a gate driving circuit that sequentially outputs gate pulses to the gate lines.

A method for driving a stereoscopic image display device according to an exemplary embodiment of the present invention comprises: a display panel comprising data lines, gate lines, and a plurality of pixels, the method comprising: outputting modulated 3D image data by modulating kth pixel data of a jth line based on the kth pixel data of the jth line and kth pixel data of a line adjacent to the jth line, wherein k is a natural number less than or equal to n and greater than 1, and n is a horizontal resolution of the display panel, wherein j is a natural number less than or equal to m and greater than 2, and m is a vertical resolution of the display panel; converting the modulated 3D image data into analog data voltages and outputting the analog data voltages to the data lines; and sequentially outputting gate pulses to the gate lines.

The features and advantages described in this summary and the following detailed description are not intended to be limiting. Many additional features and advantages will be apparent to one of ordinary skill in the art in view of the drawings, specification, and claims.

BRIEF DESCRIPTION OF THE DRAWINGS

FIG. 2 is a table showing luminance values of left-eye image data and right-eye image data supplied to the related art stereoscopic image display device.

DETAILED DESCRIPTION

Figure 1:
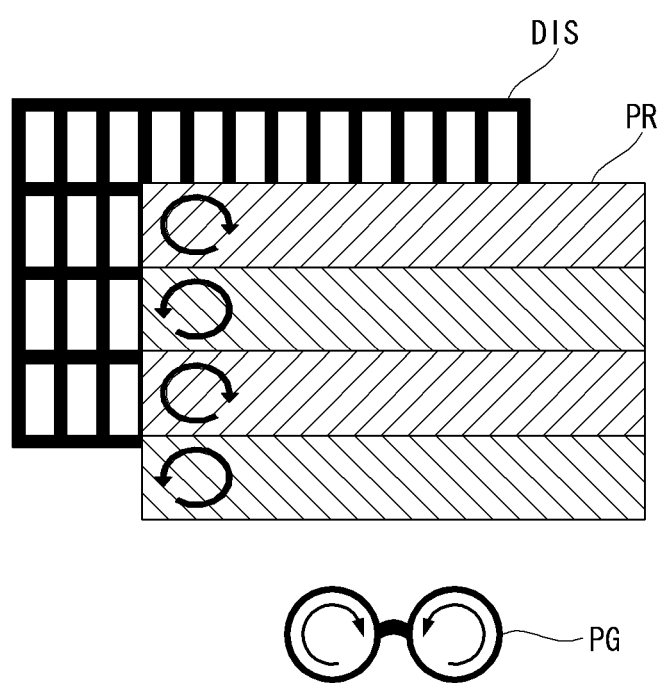
FIG. 1 is a view schematically showing a patterned retarder type stereoscopic image display device.

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

Figure 3:
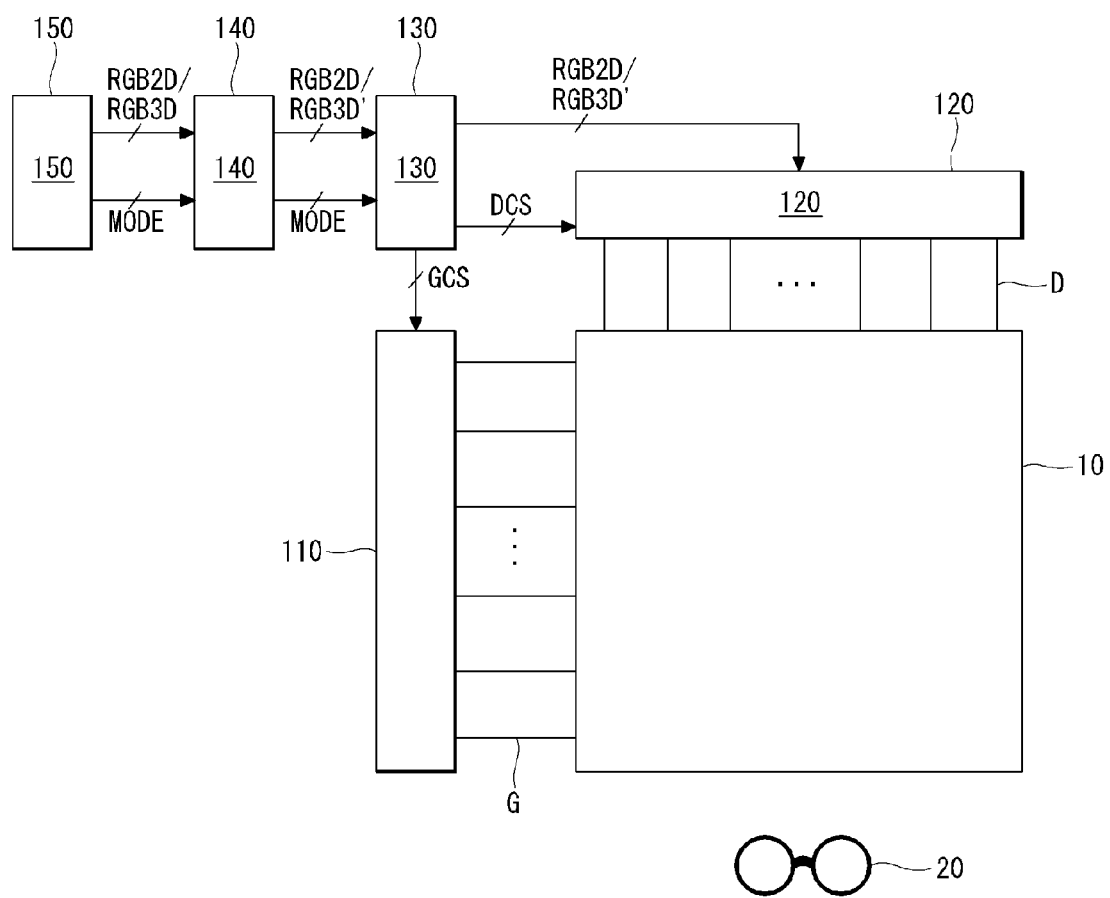
FIG. 3 is a block diagram showing a stereoscopic image display device according to an exemplary embodiment of the present invention.
Figure 4:
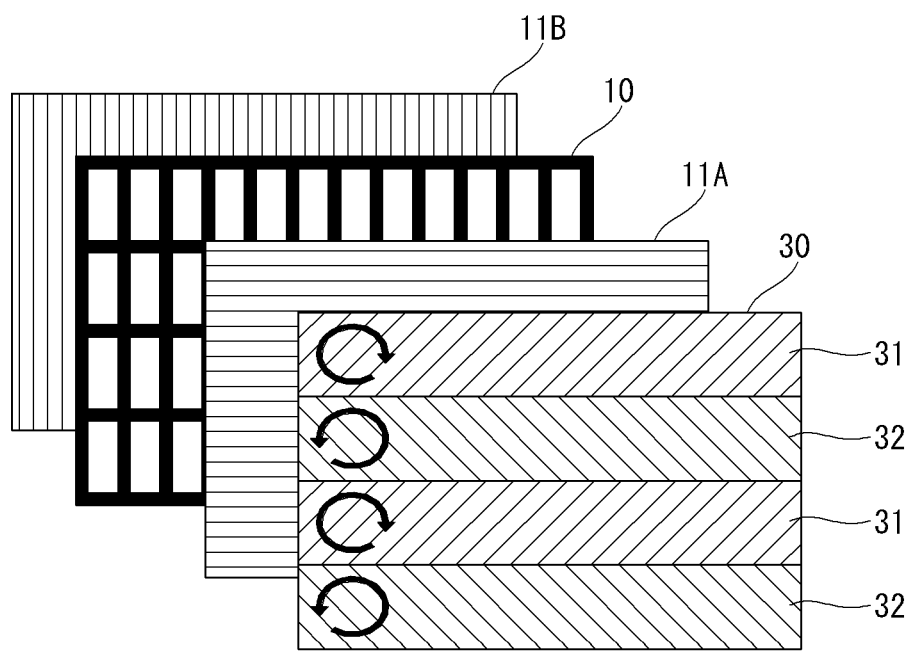
FIG. 4 is an exploded perspective view showing in detail a display panel, a patterned retarder, and polarization glasses of FIG. 3, according to one embodiment of the present invention.
Figure 4:
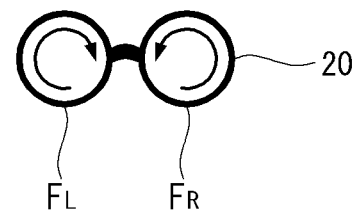

FIG. 3 is a block diagram showing a stereoscopic image display device according to an exemplary embodiment of the present invention. FIG. 4 is an exploded perspective view showing in detail a display panel, a patterned retarder, and polarization glasses of FIG. 3. It should be noted that although the stereoscopic image display device according to the following exemplary embodiment is embodied as a liquid crystal display device, the present invention is not limited thereto. The stereoscopic image display according to the exemplary embodiment of the invention may be implemented as a flat panel display device such as a liquid crystal display (LCD), a field emission display (FED), a plasma display panel (PDP), and an organic light emitting diode (OLED) element.

Referring to FIGS. 3 and 4, the stereoscopic image display device according to the present invention comprises a display panel 10, polarization glasses 20, a gate driving circuit 110, a data driving circuit 120, a timing controller 130, a data modulation unit 140, and a host system 150. The display panel 10 comprises an upper substrate and a lower substrate opposed to each other with a liquid crystal layer interposed therebetween. The display panel 10 has a pixel array comprising liquid crystal cells arranged in a matrix format according to an intersecting structure of data lines D and gate lines G (or scan lines). Each of the liquid crystal cells of the pixel array 10 is driven by a voltage difference between a pixel electrode charged with a data voltage through a TFT and a common electrode to which a common voltage is applied, and displays an image by adjusting the transmission amount of light.

A black matrix and color filters are formed on the upper glass substrate. The common electrode is formed on the upper glass substrate in a vertical electric field driving method such as a twisted nematic (TN) mode and a vertical alignment (VA) mode. On the other hand, the common electrode is formed on the lower glass substrate together with the pixel electrode in a horizontal electric field driving method such as an in plane switching (IPS) mode and a fringe field switching (FFS) mode. The display panel 10 may be implemented in any liquid crystal mode, as well as the TN mode, VA mode, IPS mode, and FFS mode.

The display panel 10 of the present invention may be implemented in any form including a transmissive liquid crystal display panel, a transflective liquid crystal display panel, and a reflective liquid crystal display panel. The transmissive liquid crystal display panel and the transflective liquid crystal display panel require a backlight unit. The backlight unit may be a direct type backlight unit or an edge type backlight unit.

An upper polarizer 11A is attached to the upper substrate of the display panel 10, and a lower polarizer 11B is attached to the lower substrate thereof. Alignment layers for setting pre-tilt angles of liquid crystals are respectively formed on the upper substrate and lower substrate of the display panel 10. A spacer is formed between the upper substrate and lower substrate of the display panel 10 so as to provide a cell gap of the liquid crystal layer.

As shown in FIG. 4, the display panel 10 displays a 2D image on its odd-numbered lines and even-numbered lines in a 2D mode. The display panel 10 displays a left-eye image (or right eye image) on the odd-numbered lines and displays a right-eye image (or left eye image) on the even-numbered lines in a 3D mode. Light of the image displayed on the pixels of the display panel 10 is incident on a patterned retarder 30 disposed on the display panel 10 through an upper polarizing film.

The patterned retarder 30 comprises a first retarder 31 formed on the odd-numbered lines and a second retarder 32 formed on the even-numbered lines. The odd-numbered lines of the display panel 10 face the first retarder, and the even-numbered lines of the display panel 10 face the second retarder 32. The first retarder 31 converts light incident from the display panel 10 into first circularly polarized light (left circularly polarized light). The second retarder 32 converts light incident from the display panel 10 into second circularly polarized light (right circularly polarized light). The polarization glasses 20 comprise a left-eye polarization filter FL for passing the first circularly polarized light converted by the first retarder 31 therethrough and a left-eye polarization filter FR for passing the second circularly polarized light converted by the second retarder 32 therethrough. For example, the left-eye filter FL can pass the left circularly polarized light therethrough, and the left-eye polarization filter FR can pass the right circularly polarized light therethrough.

As a consequence, in the patterned retarder type stereoscopic image display device, the left-eye image displayed on the pixels of the odd-numbered lines of the display panel 10 are converted into the first circularly polarized light by the first retarder 31, and the right-eye image displayed on the pixels of the even numbered lines thereof is converted into the second circularly polarized light by the second retarder 32. The first circularly polarized light passes through the left-eye polarization filter $F_L$ of the polarization glasses 20 and reaches the user's left-eye, and the second circularly polarized light passes through the right-eye polarization filter $F_R$ of the polarization glasses 20 and reaches the user's right eye. Thus, the user views only the left eye image through his or her left eye and views only the right eye image through his/her right eye.

The data driving circuit 120 comprises a plurality of source driver integrated circuits (ICs). The source driver ICs convert 2D image data RGB2D or modulated 3D image data RGB3D' into positive/negative gamma compensation voltages and generate positive/negative analog data voltages under control of the timing controller 130. The positive/negative analog data voltages output from the source drive ICs are supplied to the data lines D of the display panel 10.

The gate driving circuit 110 sequentially supplies gate pulses to the gate lines G of the display panel 10 under control of the timing controller 130. The gate driving circuit 110 may comprise a plurality of gate driver integrated circuits. Each of the gate driver ICs comprises a shift register, a level shifter for converting an output signal of the shift register into a signal having a swing width suitable for driving the TFTs of the liquid crystal cells, and an output buffer.

The timing controller 130 receives 2D image data RGB2D or modulated 3D image data RGB3D', timing signals, and a mode signal MODE from the data modulation unit 140. The timing signals comprise a vertical synchronization signal, a horizontal synchronization signal, a data enable signal, and a clock signal. The mode signal MODE is a signal for indicating the 2D mode or 3D mode. The timing controller 130 generates a gate control signal GCS for controlling the gate driving circuit 110 and a data control signal DCS for controlling the data driving circuit 120 based on the 2D image data RGB2D or modulated 3D image data RGB3D', timing signals, and mode signal MODE. The timing controller 130 supplies the gate control signal GCS to the gate driving circuit 110. The timing controller 130 supplies the 2D image data RGB2D or modulated 3D image data RGB3D' and the data control signal DCS to the data driving circuit 120.

The host system 150 comprises a system-on-chip having a scaler incorporated therein to convert 2D image data RGB2D or 3D image data RGB3D from an external video source into a data format with a resolution appropriate to display it on the display panel 10. The host system 150 may comprise a 3D formatter for converting the 3D image data RGB3D into a 3D format in the 3D mode. The 3D formatter may be configured to arrange left-eye image data on the odd-numbered lines and right-eye image data on the even-numbered lines in accordance with the patterned retarder method.

The host system 150 supplies the 2D image data RGB2D or 3D image data RGB3D to the data modulation unit 140 through an interface such as a low voltage differential signaling (LVDS) interface and a transition minimized differential signaling interface. The host system 150 supplies the timing signals and the mode signal MODE to the data modulation unit 140.

In the 2D mode, the data modulation unit 140 outputs the 2D image data RGB2D to the timing controller 130 without data modulation. In the 3D mode, the data modulation unit 140 receives the 3D image data RGB3D. The data modulation unit 140 modulates kth pixel data of a jth line based on a function dependent on the kth pixel data of the jth line and kth pixel data of a line adjacent to the jth line for outputting modulated 3D image data. k is an integer less than or equal to n and greater than 1, and n is a horizontal resolution of the display panel 10. j is an integer less than or equal to m and greater than 2, and m is a vertical resolution of the display panel. Now, a data modulation method of the data modulation unit 140 in the 3D mode will be described in detail in conjunction with FIGS. 5 and 6.

Figure 5:
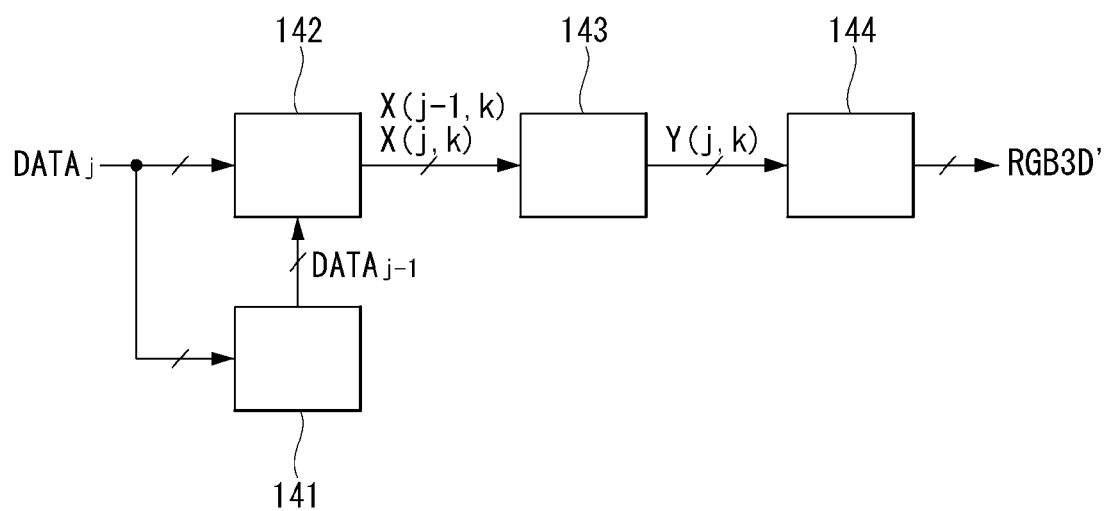
FIG. 5 is a block diagram showing in detail a data modulation unit of FIG. 3, according to one embodiment of the present invention.
Figure 6:
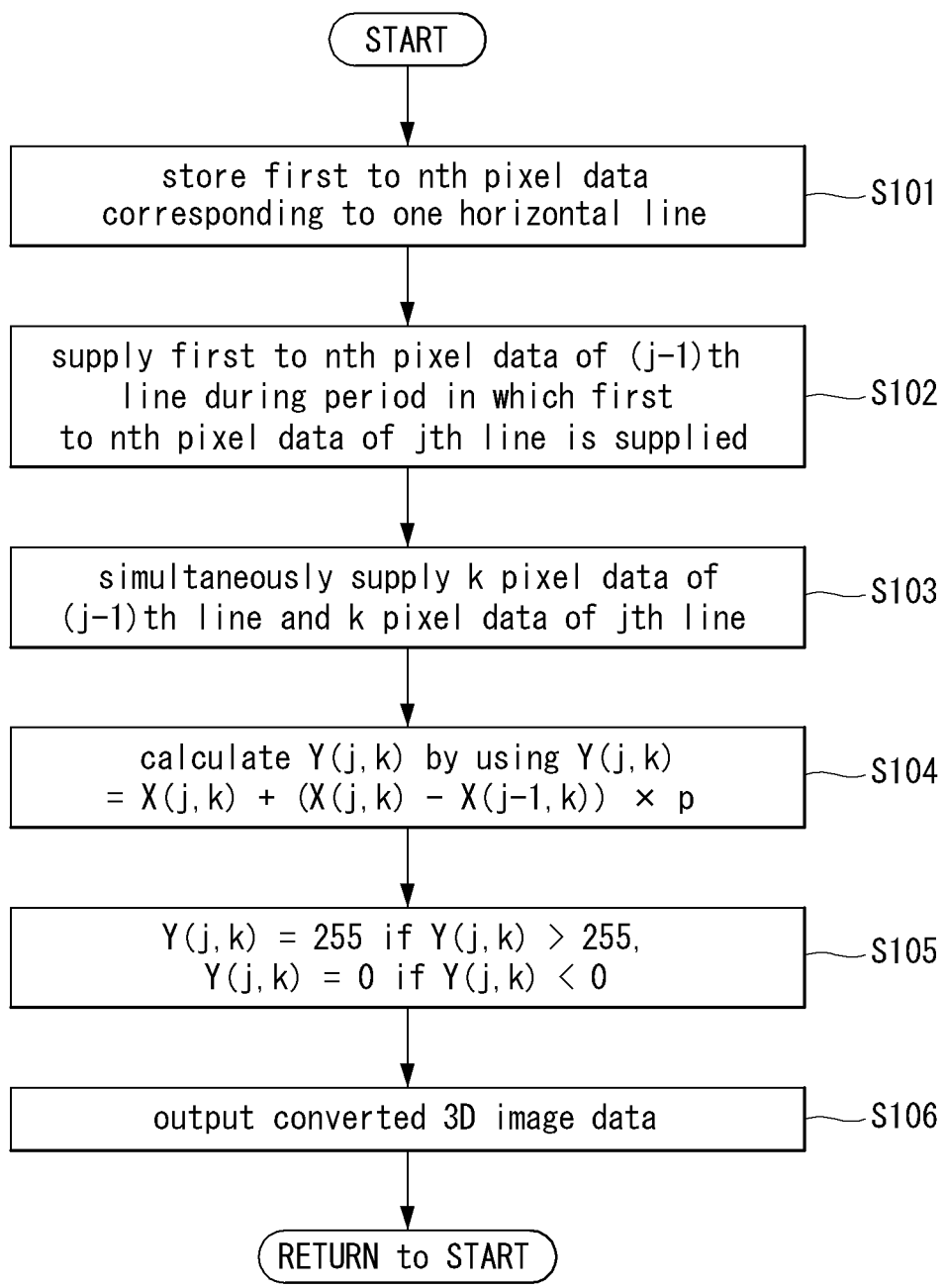
FIG. 6 is a flowchart showing in detail a data modulation method of the data modulation unit of FIG. 5, according to on embodiment of the present invention.

FIG. 5 is a block diagram showing in detail a data modulation unit of FIG. 3. FIG. 6 is a flowchart showing in detail a data modulation method of the data modulation unit of FIG. 5. Referring to FIGS. 5 and 6, the data modulation unit 140 comprises a line memory 141, a data synchronizer 142, a data calculator 143, and a data output part 144. The line memory 141 performs the steps S101 and S102, the data synchronizer 142 performs the step S103, the data calculator 143 performs the steps S104 and S105, and the data output part 144 performs the step S106. It should be noted that, although the line adjacent to the jth line is a (j−1)th line in FIGS. 5 and 6, the exemplary embodiment of the present invention is not limited thereto. That is to say, in the exemplary embodiment of the present invention, the line adjacent to the jth line may be a (j−1)th line or (j+1)th line. The (j−1)th, jth, and (j+1)th lines denote horizontal lines.

Figure 7:
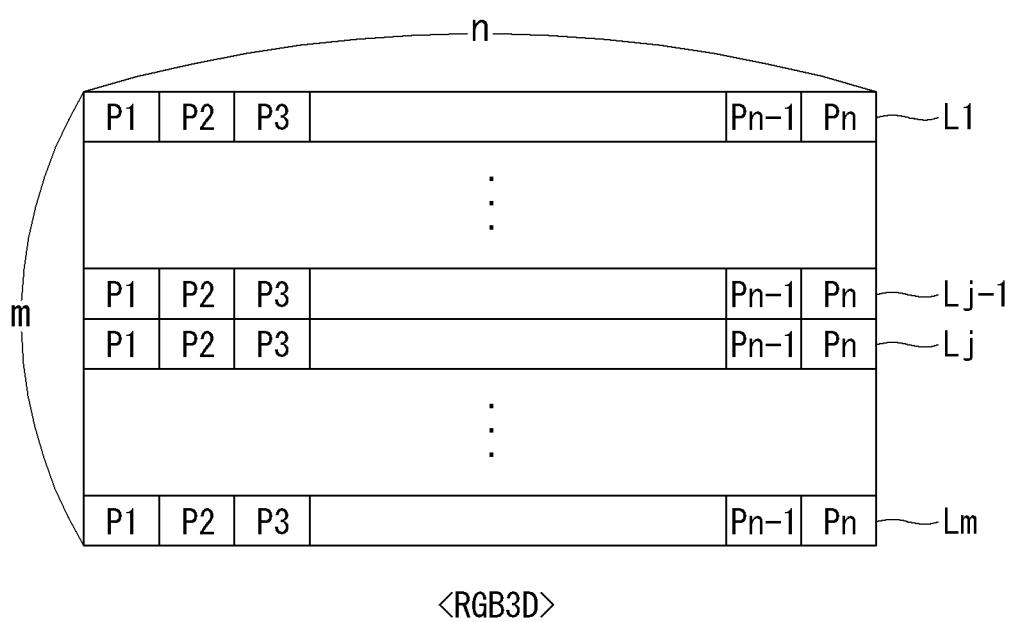
FIG. 7 is a view showing 3D image data with a resolution of m×n, according to on embodiment of the present invention.

The line memory 141 stores the 3D image data RGB3D input from the host system 150 line by line, and updates the stored data line by line. FIG. 7 is a view showing 3D image data with a resolution of n×m. Referring to FIG. 7, the 3D image data RGB3D may be divided into first to mth lines L1 to Lm, and each of the first to mth lines L1 to Lm contains first to nth pixel data P1 to Pn, respectively. The first to mth lines L1 to Lm denote horizontal lines. The 3D image data RGB3D is sequentially input line by line into the data modulation unit 140. That is, the 3D image data RGB3D is sequentially input line by line into the line memory 141 and the data synchronizer 142, and the line memory 141 stores first to nth pixel data corresponding to one horizontal line (S101).

Upon receiving first to nth pixel data DATAj of the jth line from the host system 150, the data synchronizer 142 receives first to nth pixel data DATAj−1 of the (j−1)th line from the line memory 141. The line memory 141 supplies the pre-stored first to nth pixel data DATAj−1 of the (j−1)th line during a period in which the first to nth pixel data DATAj of the jth line is supplied to the data synchronizer 142. At the same time, the line memory 141 stores the first to nth pixel data DATAj of the jth line supplied from the host system 150.

Alternatively, upon receiving first to nth pixel data DATAj+1 of the (j+1)th line from the host system 150, the data synchronizer 142 receives first to nth pixel data DATAj of the jth line from the line memory 141. The line memory 141 supplies the pre-stored first to nth pixel data DATAj of the jth line during a period in which the first to nth pixel data DATAj+1 of the (j+1)th line is supplied to the data synchronizer 142. At the same time, the line memory 141 stores the first to nth pixel data DATAj+1 of the (j+1)th line supplied from the host system 150 (S102).

The data synchronizer 142 simultaneously supplies kth pixel data X(j−1,k) of the (j−1)th line and kth pixel data X(j,k) of the jth line to the data calculator 143. Due to this, the data calculator 143 can calculate kth pixel modulation data Y(j,k) of the jth line based on a function dependent on the kth pixel data X(j−1,k) of the (j−1)th line and the kth pixel data X(j,k) of the jth line (S103).

The data calculator 143 calculates the kth pixel modulation data Y(j,k) of the jth line based on the function dependent on the kth pixel data X(j−1,k) of the (j−1)th line and the kth pixel data X(j,k) of the jth line. That is, the data calculator 143 calculates the kth pixel modulation data Y(j,k) of the jth line based on the function dependent on the kth pixel data X(j−1,k) of the (j−1)th line and the kth pixel data X(j,k) of the jth line, as shown in following Equation 1:

$$Y(j,k)=X(j,k)+(X(j,k)-X(j-1,k))\times p \quad (1)$$

Y(j,k) denotes the kth pixel modulation data of the jth line, X(j−1,k) denotes the kth pixel data of the (j−1)th line, X(j,k) denotes the kth pixel data of the jth line, and p denotes a parameter. Referring to Equation 1, the kth pixel modulation data Y(j,k) of the jth line becomes larger as the difference between the kth pixel data X(j−1,k) of the (j−1)th line and the kth pixel data X(j,k) of the jth line becomes larger, and decreases as it becomes smaller. Also, the parameter p is multiplied with the difference to increase or decrease the difference. That is, the parameter p is a value for adjusting the degree of modulation of the kth pixel modulation data Y(j,k) of the jth line, which can be stored in a memory included in the data calculator 143. Therefore, the user can adjust the degree of compensation for 3D crosstalk by adjusting the parameter p stored in the memory. The kth pixel modulation data Y(j,k) of the jth line increases as the parameter becomes larger, and decreases as the parameter p becomes smaller (S104).

Meanwhile, a description is made on the assumption that the kth pixel data X(j−1,k) of the (j−1)th line, the kth pixel data X(j,k) of the jth line, and the kth pixel modulation data Y(j,k) of the jth line are 8-bit data having a gray scale value of 0 to 255. "0" is a minimum gray scale level and "255" is a maximum gray scale level when the kth pixel data X(j−1,k) of the (j−1)th line, the kth pixel data X(j,k) of the jth line, and the kth pixel modulation data Y(j,k) of the jth line are 8-bit data. In this case, the kth pixel modulation data Y(j,k) of the jth line has a value not less than the gray scale value of 0 and not greater than the gray scale value of 255. Therefore, if the kth pixel modulation data Y(j,k) of the jth line has a value greater than the gray scale value of 255, as show in Equation 2, the data calculator 143 corrects the kth pixel modulation data Y(j,k) of the jth line to the gray scale value of 255. If the kth pixel modulation data Y(j,k) of the jth line has a value greater than the gray scale value of 0, the data calculator 143 corrects the kth pixel modulation data Y(j,k) of the jth line to the gray scale value of 0.

$$Y(j,k)=255, \text{ if } Y(j,k)>255$$

$$Y(j,k)=0, \text{ if } Y(j,k)<0 \quad (2)$$

Figure 8:
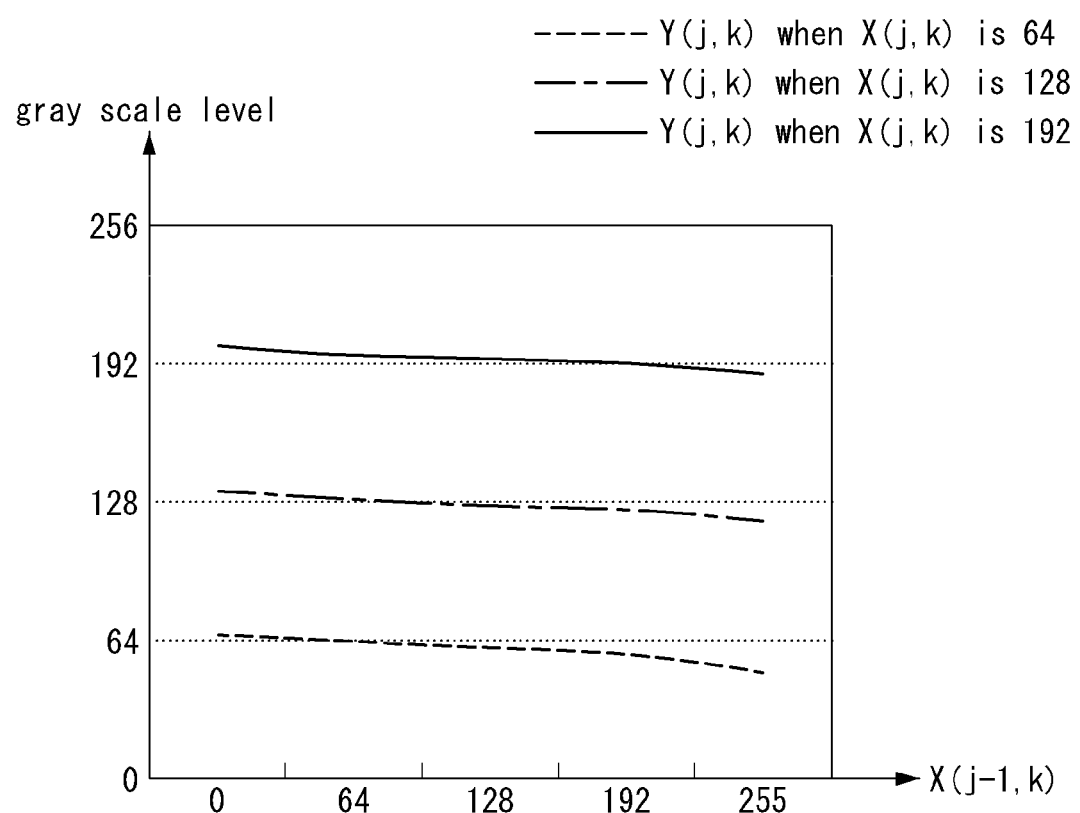
FIG. 8 is a table and graph showing kth pixel modulation data of a jth line based on kth pixel data of a (j−1)th line and kth pixel data of the jth line, according to on embodiment of the present invention.

FIG. 8 is a table and graph showing kth pixel modulation data of a jth line based on kth pixel data of a (j−1)th line and kth pixel data of the jth line. The graph and table of FIG. 8 show the kth pixel data X(j−1,k) of the (j−1)th line and the kth pixel data X(j,k) of the jth line, which are variables of Equations 1 and 2, and the kth pixel modulation data Y(j,k) of the jth line calculated based on the above data. The graph of FIG. 8 shows values of the kth pixel modulation data X(j,k) of the jth line based on the kth pixel data X(j−1,k) of the (j−1)th line when the kth pixel data X(j,k) of the jth line has a gray scale value of 64, a gray scale value of 128, and a gray scale value of 192. The table of FIG. 8 shows values of the kth pixel modulation data X(j,k) of the jth line when the kth pixel data X(j−1,k) of the (j−1)th line and the kth pixel data X(j,k) of the jth line have a gray scale value of 0, a gray scale value of 64, a gray scale value of 128, a gray scale value of 192, and a gray scale value of 255.

Referring to FIG. 8, if the kth pixel data X(j,k) of the jth line is the same, the kth pixel modulation data Y(j,k) of the jth line becomes smaller as the kth pixel data X(j−1,k) of the (j−1)th line becomes larger. However, the kth pixel modulation data Y(j,k) of the jth line has a constant value, irrespective of the kth pixel data X(j−1,k) of the (j−1)th line, for the gray scale value of 0 and the gray scale value of 255.

The patterned retarder type stereoscopic image display device supplies left-eye image data to the odd-numbered lines and right-eye image data to the odd-numbered lines in order to display different images to neighboring lines in the 3D mode. That is, if the kth pixel data X(j,k) of the jth line is the left-eye image data, the kth pixel data X(j−1,k) of the (j−1)th line is the right-eye image data. If there is a large difference between the kth pixel data X(j,k) of the jth line and the kth pixel data X(j−1,k) of the (j−1)th line, this means that the difference between the left-eye image data supplied to the kth pixel of the jth line and the right-eye image supplied to the kth pixel of the (j−1)th line is large. That is, the larger the difference between the right-eye image supplied to the kth pixel of the (j−1)th line and the left-eye image data supplied to the kth pixel of the jth line is, the more the left-eye image data supplied to the kth pixel of the jth line is affected by the right-eye image data supplied to the kth pixel of the (j−1)th line. Due to this, the user may perceive 3D crosstalk in which the user sees doubled images by leaking part of the right-eye image into the left-eye image displayed on the kth pixel of the (j−1)th line or leaking part of the left-eye image into the right-eye image displayed on the kth pixel of the jth line. In the present invention, however, the effect of the right-eye image data supplied to the kth pixel of the (j−1)th line on the left-eye image data supplied to the kth pixel of the jth line is taken into consideration so that the kth pixel modulation data of the jth line is modulated to a larger extent as the difference between the kth pixel data X(j−1,k) of the (j−1) line and the k pixel data X(j,k) of the jth line becomes larger. As a result, the user perceives less 3D crosstalk (S104).

The data output part 144 receives the kth pixel modulation data Y(j,k) of the jth line from the data calculator 143. Particularly, the data output part 144 receives all of the first to nth pixel modulation data of the first to mth lines calculated by the data calculator 143, and then outputs modulated 3D image data RGB3D' with a resolution of n×m to the timing controller 130 (S105).

Figure 9:
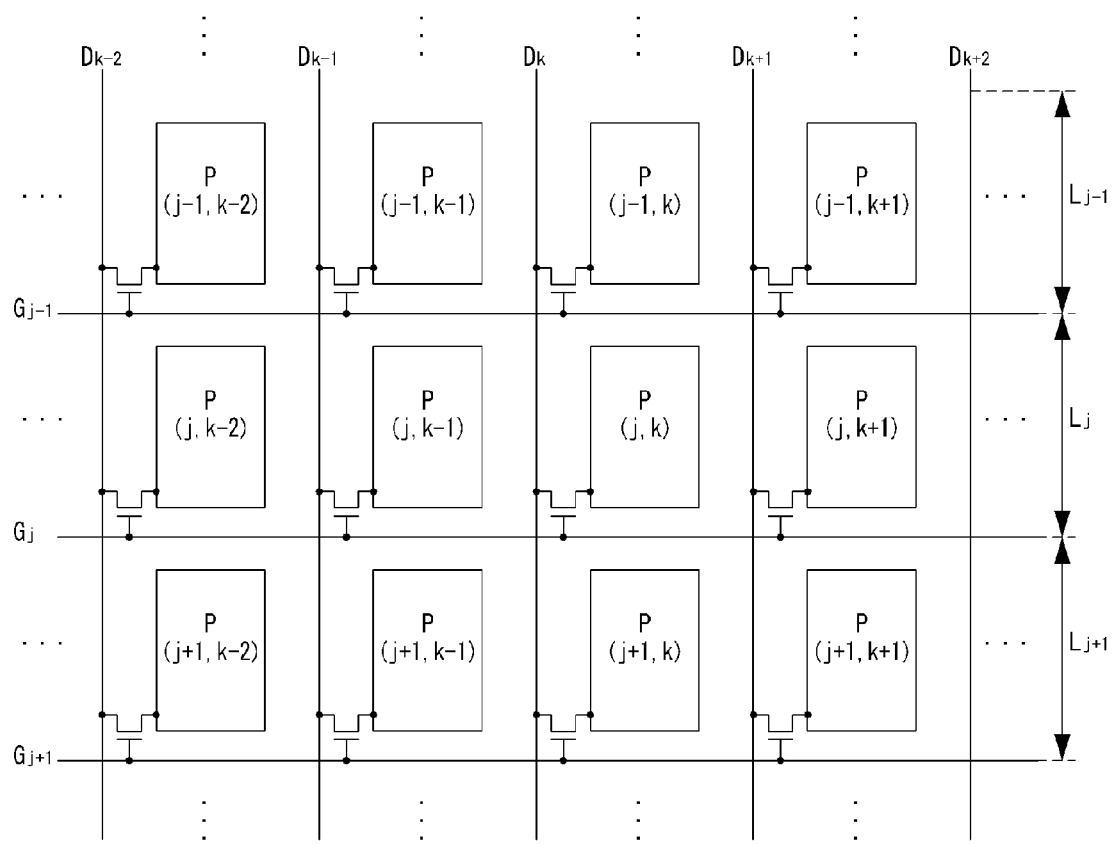
FIG. 9 is a view schematically showing the arrangement of pixels of a display panel according to a first exemplary embodiment of the present invention, according to on embodiment of the present invention.

FIG. 9 is a view schematically showing the arrangement of pixels of the display panel according to a first exemplary embodiment of the present invention. FIG. 9 depicts (k−2)th to (k+1)th pixels P(j−1,k−2) of a (j−1)th line connected to a (j−1)th gate line G j−1, pixels P(j−1,k−1), P(j−1,k), and P(j−1,k+1) connected to a jth gate line Gj, and (k−2)th to (k+1) pixels P(j,k−2), P(j,k−1), P(j,k), P(j,k+1), and P(j−1, k−2) of the jth line connected to a (j+1)th gate line Gj+1. Each of the pixels is charged with a data voltage supplied through a data line in response to a gate pulse supplied through a gate line.

Referring to FIG. 9, the kth pixel P(j−1,k) of the (j−1)th line, the kth pixel P(j,k) of the jth line, and the kth pixel P(j+1,k) of the (j+1)th line are connected to the same kth data line Dk. That is, the kth pixel of each line is connected to the kth data line Dk. In this case, the timing controller 130 controls the data driving circuit 120 to sequentially supply a kth pixel data voltage of the (j−1)th line, a kth pixel data voltage of the jth line, and a kth pixel data voltage of the (j+1)th line through the kth data line Dk. The data driving circuit 120 may be implemented to supply data voltages in a dot inversion method, a horizontal 2-dot inversion method, a vertical 2-dot inversion method, and a column inversion method.

Figure 10:
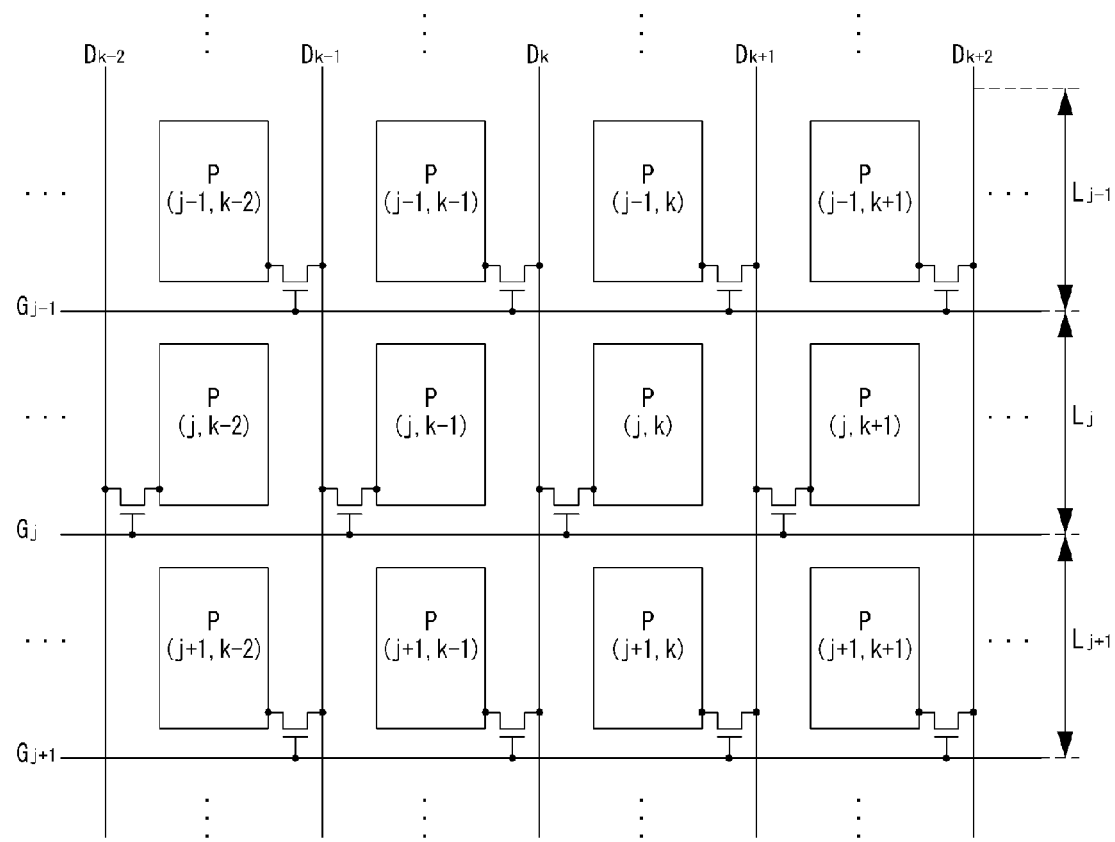
FIG. 10 is a view schematically showing the arrangement of pixels of a display panel according to a second exemplary embodiment of the present invention, according to on embodiment of the present invention.

FIG. 10 is a view schematically showing the arrangement of pixels of a display panel according to a second exemplary embodiment of the present invention. FIG. 10 depicts (k−2)th to (k+1)th pixels P(j−1,k−2) of a (j−1)th line connected to a (j−1)th gate line Gj−1, pixels P(j−1,k−1), P(j−1,k), and P(j−1,k+1) connected to a jth gate line Gj, and (k−2)th to (k+1) pixels P(j,k−2), P(j,k−1), P(j,k), P(j,k+1), and P(j−1, k−2) of the jth line connected to a (j+1)th gate line Gj+1. Each of the pixels is charged with a data voltage supplied through a data line in response to a gate pulse supplied through a gate line.

Referring to FIG. 10, the kth pixel P(j−1,k) of the (j−1)th line and the kth pixel P(j,k) of the jth line are respectively connected to different data lines. The kth pixel P(j,k) of the jth line and the kth pixel P(j+1,k) of the (j+1)th line are respectively connected to different data lines. That is, the kth pixel P(j−1,k) of the (j−1)th line is connected to a (k+1)th data line Dk+1, and the kth pixel P(j,k) of the (j+1)th line is connected to a kth data line Dk, and the kth pixel P(j+1,k) of the (j+1)th line is connected to the (k+1)th data line Dk+1. In this case, the timing controller 130 controls the data driving circuit 120 to supply a kth pixel data voltage of the (j−1)th line through the (k+1)th data line Dk+1, a kth pixel data voltage of the jth line through the kth data line Dk, and a kth pixel data voltage of the (j+1)th line through the (k+1)th data line Dk+1. That is, the timing controller 130 controls the data driving circuit 120 to supply a (k−1)th pixel data voltage of the (j−1)th line, a kth pixel data voltage of the jth line, and a (k−1)th pixel data voltage of the (j+1)th line through the kth data line Dk. Also, the timing controller 130 controls the data driving circuit to supply a kth pixel data voltage of the (j−1)th line, a (k+1)th pixel data voltage of the jth line, and a kth pixel data voltage of the (j+1)th line.

In the second exemplary embodiment of the present invention, the display panel 10 may be driven in a Z-inversion method. The Z-inversion refers to arranging pixels in a zigzag manner with respect to data lines D and driving the display panel 10 in the dot inversion method even if data voltages are supplied in the column inversion method. The Z-inversion method can reduce power consumption and improve picture quality.

As discussed above, the present invention modulates the kth pixel data of the jth line based on a function dependent on the kth pixel data of the jth line and the kth pixel data of a line adjacent to the jth line. That is to say, the present invention calculates the kth pixel modulation data of the jth line based on the kth pixel data of the (j−1)th line or (j+1)th line adjacent to the jth line, which has the largest effect on 3D crosstalk of the kth pixel of the jth line. As a result, the present invention can reduce 3D crosstalk, and enables the viewer to view a stereoscopic image with more stereoscopic effect.

Meanwhile, if the line adjacent to the jth line is the (j+1)th line, the (j−1)th line in the description associated with FIGS. 5 and 6 is replaced with the (j+1)th line. In this case, however, the data synchronizer 142 receives first to nth pixel data DATAj of the (j+1)th line from the host system 150. Moreover, the line memory 141 supplies the pre-stored first to nth pixel data DATAj of the jth line during a period in which the first to nth pixel data DATAj+1 of the (j+1)th line is supplied to the data synchronizer 142. At the same time, the line memory 141 stores the first to nth pixel data DATAj+1 of the (j+1)th line supplied from the host system 150.

Although the embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display device comprising:
a display panel comprising data lines, gate lines, and a plurality of pixels;
a patterned retarder on the plurality of pixels of the display panel and comprising a first retarder formed on odd-numbered lines of the pixels to polarize light from the odd-numbered lines of the pixels in a first direction and a second retarder formed on even-numbered lines of the pixels to polarize light from the even-numbered lines of the pixels in a second direction different from the first direction;
a data modulation unit configured to generate modulated 3D image data, the data modulation unit comprising (i) a memory configured to store pixel data of an adjacent pixel or a target pixel and (ii) a data calculator coupled to receive the stored pixel data of the adjacent pixel or the target pixel from the memory, the data calculator configured to calculate pixel data for a pixel in the modulated 3D image data at a same location as the target pixel by adding a difference between the pixel data of the target pixel and the pixel data of the adjacent pixel multiplied by a parameter to the pixel data of the target pixel, the adjacent pixel at a same column as the target pixel and in another row of image data adjacent to the row of the target pixel;
a data driving circuit configured to convert the modulated 3D image data into analog data voltages and output the analog data voltages to the data lines; and
a gate driving circuit configured to sequentially output gate pulses to the gate lines.

2. The stereoscopic image display device of claim 1, wherein if the pixel data of the pixel in the modulated 3D image data is less than a minimum gray scale value, the data calculator substitutes the pixel data of the pixel in the modulated 3D image data with the minimum gray scale value, and if the pixel data of the pixel in the modulated 3D image data is greater than a maximum gray scale value, the data calculator substitutes the pixel data of the pixel in the modulated 3D image data with the maximum gray scale value.

3. The stereoscopic image display device of claim 1, wherein the parameter is a value adjusting a degree of modulation of the pixel data of the target pixel in the modulated 3D image data.

4. The stereoscopic image display device of claim 1, wherein the data modulation unit further comprises a memory for storing the parameter.

5. The stereoscopic image display device of claim 1, wherein the data modulation unit further comprises:

a data synchronizer that simultaneously outputs the pixel data of the target pixel and the pixel data of the adjacent pixel to the data calculator; and wherein the memory is a line buffer coupled to a host system to receive pixel data of pixels in the other row the memory configured to supply the pixel data of pixels in the other row to the data synchronizer in synchronization with a period in which pixel data of pixels in the row of the target pixel is supplied to the data synchronizer.

6. The stereoscopic image display device of claim 1, wherein the data modulation unit further comprises:

a data synchronizer that simultaneously outputs the pixel data of the target pixel and the pixel data of the adjacent pixel to the data calculator; and wherein the memory is a line buffer coupled to a host system to receive pixel data of pixels in the row of target pixel, the memory configured to supply the pixel data of pixels in the row of the target pixel to the data synchronizer in synchronization with a period in which pixel data of pixels in the other row of the adjacent pixel is supplied to the data synchronizer.

7. The stereoscopic image display device of claim 1, wherein the target pixel and the adjacent pixel are connected to a same data line.

8. The stereoscopic image display device of claim 1, wherein the target pixel and the adjacent pixel are respectively connected to different data lines.

9. The stereoscopic image display device of claim 1, wherein the adjacent pixel is disposed above or below the target pixel.

10. A method for driving a stereoscopic image display device comprising a display panel comprising data lines, gate lines, and a plurality of pixels, the method comprising:

calculating pixel data for a pixel in modulated 3D image data at a same location as a target pixel by adding a difference between pixel data of the target pixel and pixel data of an adjacent pixel multiplied by a parameter to the pixel data of the target pixel, the adjacent pixel at a same column as the target pixel and in another row of image data adjacent to a row of the target pixel;

converting the modulated 3D image data into analog data voltages and outputting the analog data voltages to the data lines;

sequentially outputting gate pulses to the gate lines;

displaying an image on the display panel according to the analog data voltages and the gate pulses;

polarizing light from odd-numbered lines of the pixels of the display panel in a first direction by passing the light from the odd-numbered lines of the pixels through a first retarder of a patterned retarder on the display panel; and polarizing light from even-numbered lines of the pixels of the display panel in a second direction different from the first direction by passing the light from the even-numbered lines of the pixels through a second retarder of the patterned retarder.

11. The method of claim 10, wherein if the pixel data of the pixel in the modulated 3D image data is less than a minimum gray scale value, substituting the pixel data of the pixel in the modulated 3D image data with the minimum gray scale value, and if the pixel data of the pixel in the modulated 3D image data is greater than a maximum gray scale value, substituting the pixel data of the pixel in the modulated 3D image data with the maximum gray scale value.

12. The method of claim 10, wherein the parameter is a value adjusting a degree of modulation of the pixel data of the target pixel in the modulated 3D image data.

13. The method of claim 10, further comprising:

storing 3D image data input from a host system in a line memory row by row;

receiving pixel data of pixels in the row of the target pixel in synchronization with a period in which pixel data of pixels in the other row of the adjacent pixels is supplied; and simultaneously outputting the pixel data of the target pixel and the pixel data of the adjacent pixel for calculating the pixel data for the pixel in the modulated 3D image data.

14. The method of claim 10, further comprising:

storing 3D image data input from a host system in a line memory row by row;

receiving pixel data of pixels in the row of the target pixel from the line memory in synchronization with a period in which pixel data of pixels in the other row of the adjacent pixel is supplied; and simultaneously outputting the pixel data of the target pixel and the pixel data of the adjacent pixel for calculating the pixel data for the pixel in the modulated 3D image data.

15. The method of claim 10, wherein the analog data voltages are supplied to the target pixel and the adjacent pixel through the same data line.

16. The method of claim 10, wherein the analog data voltages are supplied to the target pixel and the adjacent pixel through different data lines.

17. The method of claim 10, wherein the adjacent pixel is disposed above or below the target pixel.

* * * * *